(12) United States Patent
Filippi et al.

(10) Patent No.: US 9,514,308 B2
(45) Date of Patent: Dec. 6, 2016

(54) TAMPER DETECTION ARRANGEMENT FOR INTEGRATED CIRCUITS

(71) Applicants: QATAR FOUNDATION, Doha (QA); Altis Semiconductor, Corbeil Essonnes (FR)

(72) Inventors: Raymond Filippi, Doha (QA); Jean-Michel Cioranesco, Corbeil Essones (FR)

(73) Assignees: Qatar Foundation, Doha (QA); Altis Semiconductor, Corbeil Essoness (FR)

( * ) Notice: Subject to any disclaimer, the term of this patent is extended or adjusted under 35 U.S.C. 154(b) by 386 days.

(21) Appl. No.: 14/204,739

(22) Filed: Mar. 11, 2014

(65) Prior Publication Data

US 2014/0320151 A1    Oct. 30, 2014

Related U.S. Application Data

(63) Continuation of application No. PCT/IB2012/003115, filed on Oct. 29, 2012.

(51) Int. Cl.
*G06F 21/60* (2013.01)
*H01L 23/00* (2006.01)
*G06F 21/87* (2013.01)

(52) U.S. Cl.
CPC ............ *G06F 21/60* (2013.01); *G06F 21/87* (2013.01); *H01L 23/576* (2013.01); *H01L 2924/0002* (2013.01)

(58) Field of Classification Search
CPC ........ G06F 21/60; G06F 21/87; H01L 23/576; H01L 2924/0002
USPC .................................................. 324/679, 658
See application file for complete search history.

(56) References Cited

U.S. PATENT DOCUMENTS

| | | | |
|---|---|---|---|
| 6,496,119 B1 | 12/2002 | Otterstedt et al. | 340/653 |
| 6,747,558 B1* | 6/2004 | Thorne | G06K 19/07798 |
| | | | 340/545.6 |
| 6,798,234 B2 | 9/2004 | Laackmann et al. | 326/21 |
| 2010/0026313 A1* | 2/2010 | Bartley | H01L 23/576 |
| | | | 324/548 |

(Continued)

FOREIGN PATENT DOCUMENTS

| | | |
|---|---|---|
| EP | 1400887 | 3/2004 |
| JP | 55-042424 | 3/1980 |

OTHER PUBLICATIONS

International Search Report and Written Opinion, dated Jul. 22, 2013, from related, co-owned International Patent Application No. PCT/IB2012/003115.

*Primary Examiner* — Billy Lactaoen
(74) *Attorney, Agent, or Firm* — Greenberg Traurig, LLP

(57) ABSTRACT

A tamper detection arrangement for use within an integrated circuit (1), the arrangement comprising: at least one input capacitor (4) having a first capacitance value; a feedback capacitor (5) having a second capacitance value; a sensing arrangement comprising an amplifier circuit having the at least one input capacitor as an input and the at least one feedback capacitor in a feedback loop across the amplifier operable to detect a change in the capacitance values between the at least one input capacitor and the feedback capacitor; and a protective shield to protect a sensitive area (2) of the integrated circuit from tampering, the shield being provided by the at least one input capacitor (4).

28 Claims, 7 Drawing Sheets

(56) References Cited

U.S. PATENT DOCUMENTS

| | | | | |
|---|---|---|---|---|
| 2010/0026506 A1* | 2/2010 | Bartley | ................... | G06F 21/86 340/657 |
| 2010/0187525 A1* | 7/2010 | Bartley | ................... | G06F 21/75 257/48 |
| 2012/0199948 A1* | 8/2012 | Saisse | ..................... | G06F 21/87 257/532 |

* cited by examiner

Metal layer N

Metal layer N-1

Figure 2: Embodiment of a 2 layer fringe cap

Alternative embodiment of a two layer fringe cap with a single finger for each plate A and B

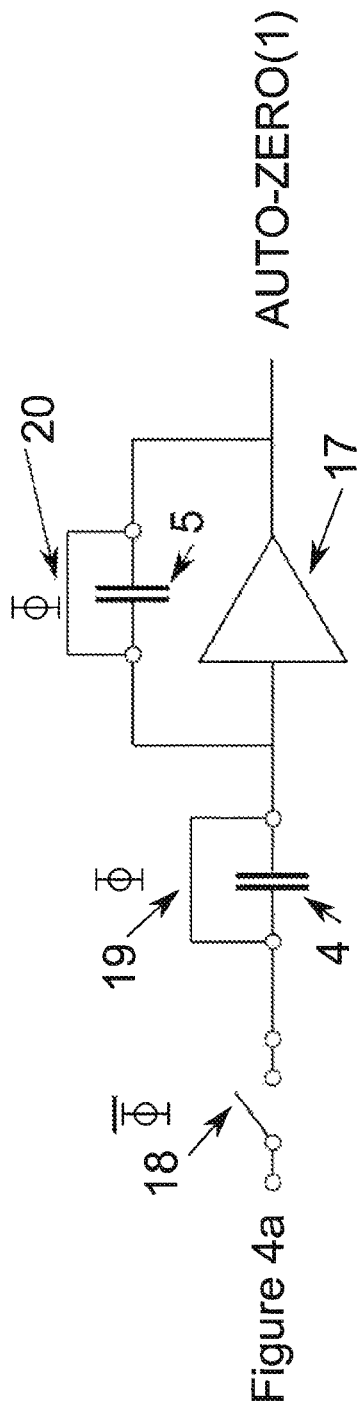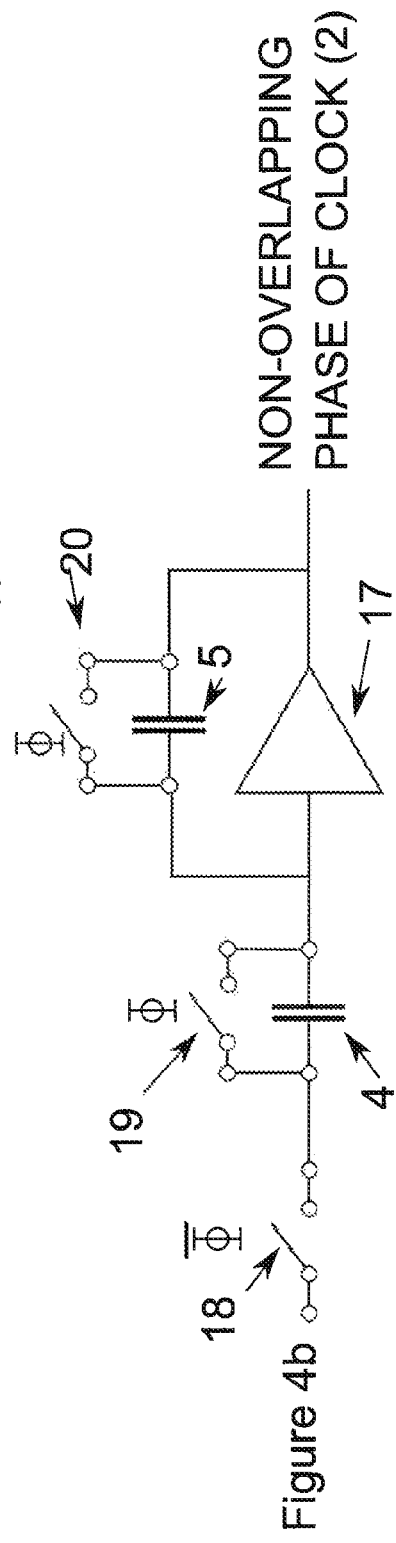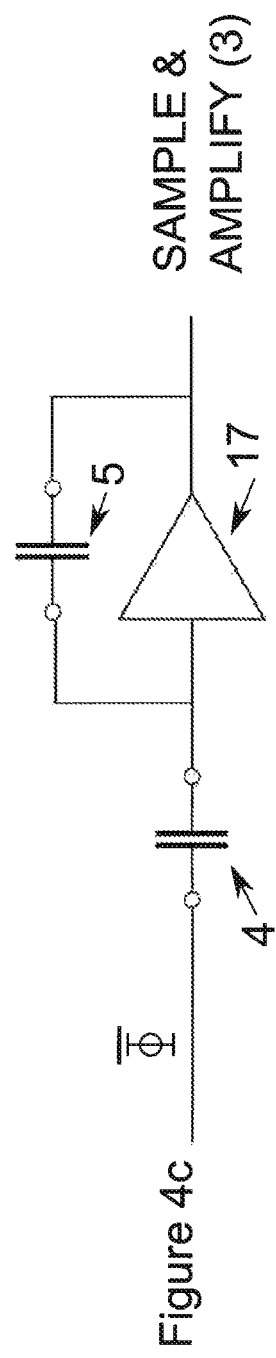

The additional switch is added to isolate the feedback capacitor under the shield

TAMPER DETECTION ARRANGEMENT FOR INTEGRATED CIRCUITS

CROSS REFERENCE TO RELATED APPLICATIONS

This application is a continuation of International Patent Application Number PCT/IB2012/003115, filed Oct. 29, 2012, entitled "A Tamper Detection Arrangement", which is incorporated herein by reference in its entirety.

FIELD OF THE INVENTION

The present invention relates to a tamper detection arrangement, and more particularly relates to a tamper detection arrangement to detect tampering to an integrated circuit.

BACKGROUND TO THE INVENTION

Sensitive information, such as encryption keys, is often stored in an integrated circuit and there is a need to protect the sensitive information from an invasive attack by a third party. There is also a need to prevent a third party from being able to monitor the internal workings of an integrated circuit with a view to reverse engineering some aspect of the integrated circuit.

When an integrated circuit is manufactured a passivation layer is created that provides mechanical protection for the layers beneath. In an invasive attack by an adversary, the passivation layer or part thereof may be removed by means of etching, laser or FIB (Focussed Ion Beam). Once the passivation layer or a selected window of the passivation layer is removed, a top layer metal is exposed. Subsequent etching, laser or FIB techniques allow access to the other metal layers beneath the top layer. The adversary can then use an electromagnetic (EM) probe to pick up local electrical signals in the exposed area from the chip. The sensed electrical signals can be recorded and then, with further post-processing analysis, sensitive information stored in the integrated circuit can be extracted or recovered.

It has been proposed previously to form an active shield layer above or below sensitive components of an integrated circuit. The active shield layer incorporates a detection arrangement to detect if the shield layer is altered physically as a result of an invasive attack. The detection arrangement detects an invasive attack and takes steps to erase or deactivate the integrated circuit to prevent a third party from gaining access to stored sensitive information or to prevent a third party from analysing the operation of the integrated circuit.

Examples of such prior-art tamper detection arrangements are disclosed in U.S. Pat. Nos. 6,798,234 and 6,496,119. In the arrangement of U.S. Pat. No. 6,798,234 an active shield layer is provided comprising at least two elongate conductive tracks added to cover the integrated circuit, i.e. over the integrated circuit itself. A drive and sensing arrangement transmits a predetermined signal over the tracks and compares the received signals to the transmitted signals. If the conductor tracks have not been modified and remain intact, then the received signals are direct representatives of the transmitted signals. If the received signals do not correspond to the transmitted signals, then this can be an indication of a broken track or a track having been tampered with. This observation is made using a normal signal measuring method. A change in signal caused by the capacitance value of the track changing can also indicate an invasive attack. A switching mechanism is provided to switch between the normal signal measuring method and the capacitive measuring method. A change in signal in either method can trigger an alarm signal to effect a function change such as erasing data held in the memory of the integrated circuit.

U.S. Pat. No. 6,496,119 discloses a similar methodology to U.S. Pat. No. 6,798,234 but with the addition of multiplexers to provide multiple signals and switching between signals and over tracks, lines and interconnects making up a protective circuit or shield provided above and/or below the integrated circuit itself.

The present invention seeks to provide an alternative tamper detection arrangement and method for detecting tampering with an integrated circuit.

One aspect of the present invention provides a tamper detection arrangement for use within an integrated circuit, the arrangement comprising: at least one input capacitor having a first capacitance value; a feedback capacitor having a second capacitance value; a sensing arrangement comprising an amplifier circuit having the at least one input capacitor as an input and the at least one feedback capacitor in a feedback loop across the amplifier operable to detect a change in the capacitance values between the at least one input capacitor and the feedback capacitor; and a protective shield to protect a sensitive area of the integrated circuit from tampering, the shield being provided by the at least one input capacitor.

Preferably, at least a part of the input capacitor is formed from at least one layer of a metal stack of the integrated circuit.

Advantageously, the sensing arrangement is operable to detect a change in the ratio of capacitance values between the at least one input capacitor and the feedback capacitor.

Preferably, the amplifier circuit comprises a differential amplifier.

Conveniently, the gain of the amplifier circuit is dictated by the ratio of capacitance values between the at least one input capacitor and the feedback capacitance.

Preferably, plural input capacitors are connected to the sensing arrangement by a multiplexer.

Conveniently, the sequencing of the multiplexer is changeable and/or is pseudo-random.

Advantageously, the multiplexer switches so that different pairs of capacitors from the input capacitor array are compared in respective measurement cycles.

Another aspect of the present invention provides a tamper detection arrangement in an integrated circuit having a stack of metal layers, the arrangement comprising: at least one input capacitor having a first capacitance value; and a protective shield to protect a sensitive area of the integrated circuit from tampering, the shield being provided by the at least one input capacitor, wherein at least a part of the input capacitor is formed from at least a part of one of the metal layers of the metal stack of the integrated circuit.

Another aspect of the present invention provides an integrated circuit incorporating the tamper detection arrangement.

A further aspect of the present invention provides an integrated circuit package incorporating the integrated circuit incorporating the tamper detection arrangement.

Another aspect of the present invention provides a method of detecting physical tampering with an integrated circuit, the method comprising: providing at least one input capacitor having a first capacitance value; providing a feedback capacitor having a second capacitance value; providing a sensing arrangement comprising an amplifier circuit having the at least one input capacitor as an input and the at least one feedback capacitor in a feedback loop across the amplifier; forming a protective shield to protect a sensitive area of the integrated circuit from at least a part of the at least one input capacitor, wherein the method comprises detecting a change in the capacitance values between the at least one input capacitor and the feedback capacitor and/or detecting a change in the ratio of capacitance values between the at least one input capacitor and the feedback capacitor.

BRIEF DESCRIPTION OF THE DRAWINGS

In order that the invention may be more readily understood, and so that further features thereof may be appreciated, embodiments of the invention will now be described, by way of example, with reference to the accompanying drawings in which:

FIG. 4a is an example circuit diagram of a single ended switched capacitor amplifier that forms part of an embodiment of the invention in a first mode of operation;

FIG. 4b is a circuit diagram corresponding to FIG. 4a in a second mode of operation;

FIG. 4c is a circuit diagram corresponding to FIG. 4a in a third mode of operation;

DETAILED DESCRIPTION OF EMBODIMENTS OF THE PRESENT INVENTION

Figure 1:
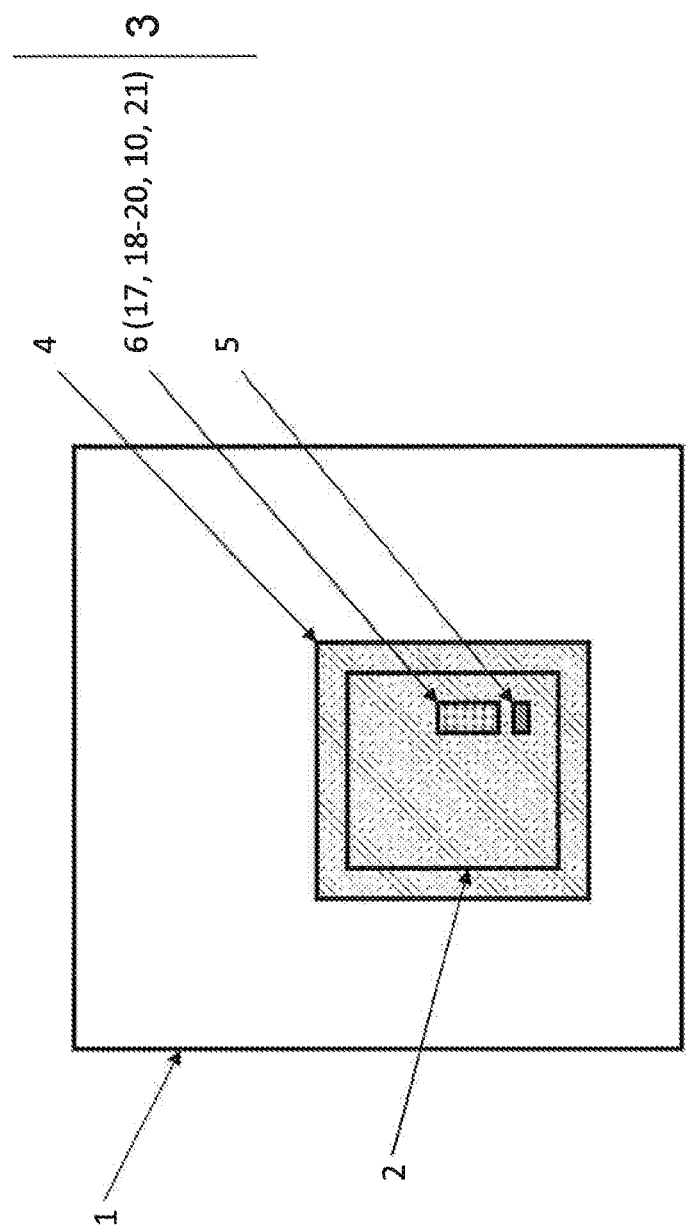
FIG. 1 is a block diagram plan view of an integrated circuit comprising a tamper detection arrangement of one embodiment of the invention.

IC General Construction:

Referring to the Figures, an integrated circuit (IC) 1 has a laminar construction and comprises many components, mainly transistors in a silicon substrate with a metal stack of interconnect metal layers lying above the silicon substrate. The interconnect metal layers connect the IC components together as required by the design topology.

A fringe capacitor is a component of the IC that is formed in the metal stack of the silicon chip. Fringe capacitors require no special manufacturing or chip fabrication techniques and are an inherent component of the IC that arises from the IC manufacturing process. The number of interconnect metal layers in an IC can be as few as four or as many as fourteen or fifteen. With advanced deep-submicron technologies the number of metal layers available may increase further.

The IC 1 contains one or more security sensitive areas 2. The security sensitive areas 2 need to be secured against invasive attack. These sensitive areas 2, when secured by examples of the present invention are referred to as shielded areas 2.

Tamper Detection Arrangement—Spatial Considerations:

A tamper detection arrangement of an embodiment of the invention is integrated within the construction of the IC 1 to secure a sensitive area 2 from an invasive attack.

The tamper detection arrangement 3 incorporates an array of input capacitors 4 covering the shielded area 2 and a feedback capacitor 5 beneath the shield formed by the input capacitor array 4. The feedback capacitor 5 may also be configured as a fringe capacitor and formed from metal layer(s) of the IC 1. It is also possible in another embodiment that the feedback capacitor is not a fringe capacitor.

The sensitive area 2 is preferably smaller and within the plan boundary of the capacitor array 4 as shown in FIG. 1. The area (value of capacitance) of the feedback capacitor 5 is designed to be small in comparison with the input unit array area (value of capacitance) capacitor, as it is this ratio of these capacitances that sets the gain of the switched capacitor amplifier. The feedback capacitor 5 sits within the boundaries of both the capacitor array 4 and the sensitive area 2.

If the feedback capacitor was positioned outside the secure area 2, then this would be very detrimental in an attack, the adversary could simply place a probe on the feedback capacitor this would greatly increase its capacitance, reducing the switch cap amplifier gain to such an extent that if the secure area shield was simultaneously attacked the detector would not trigger because of the low amplifier gain.

The capacitor array 4 may be formed within the IC 1 in the metal layers immediately above the layers containing the sensitive area 2. The capacitor array 4 may be in metal layers not immediately above the layer or layers containing the sensitive area 2, i.e. separated therefrom by one or more layers.

Other forms of amplifier can be used. What is important is that the amplifier output is sensitive to changes in the input capacitance (with respect to the feedback capacitance). Using a small capacitance value (area) feedback capacitor and a larger area (capacitance value) input capacitor results in a high gain amplifier, i.e. an amplifier which is sensitive to small changes in the input capacitance which will be amplified as the output of the sensing arrangement.

The array of capacitors and the switch capacitor amplifier:

The capacitors in FIG. 2 each have a predetermined capacitance value which is determined by the positioning and shape of the finger patterns within each capacitor—predominantly the capacitance is sidewall capacitance as opposed to the lesser capacitive contribution by the capacitance between the overlap of the metal layers.

Furthermore it is advantageous to use fringe capacitors in integrated circuits as fringe capacitors have very low temperature coefficients and very low voltage coefficients so their absolute value is not changed significantly by these second order effects.

Fringe capacitors of this kind are also known as vertical parallel plate capacitors or sandwich capacitors. This specification refers to such capacitors collectively as fringe capacitors.

Figures 2A, 2B:
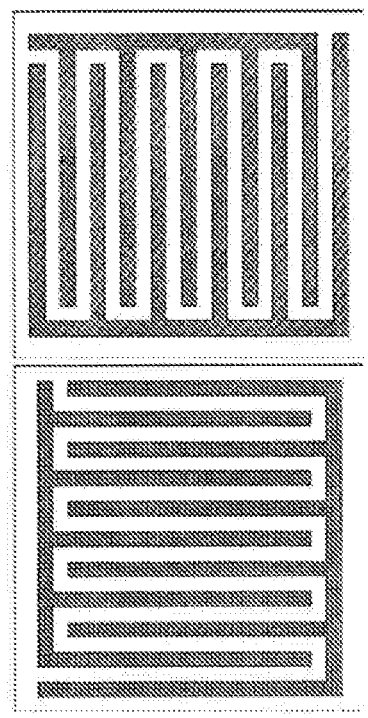
FIG. 2a is a layout top view of one layer of a two layer embodiment of a metal fringe capacitor for use in embodiments of the invention.
FIG. 2b is a layout top view of a second layer of a two layer embodiment of a metal fringe capacitor for use in embodiments of the invention.
Figure 2C:
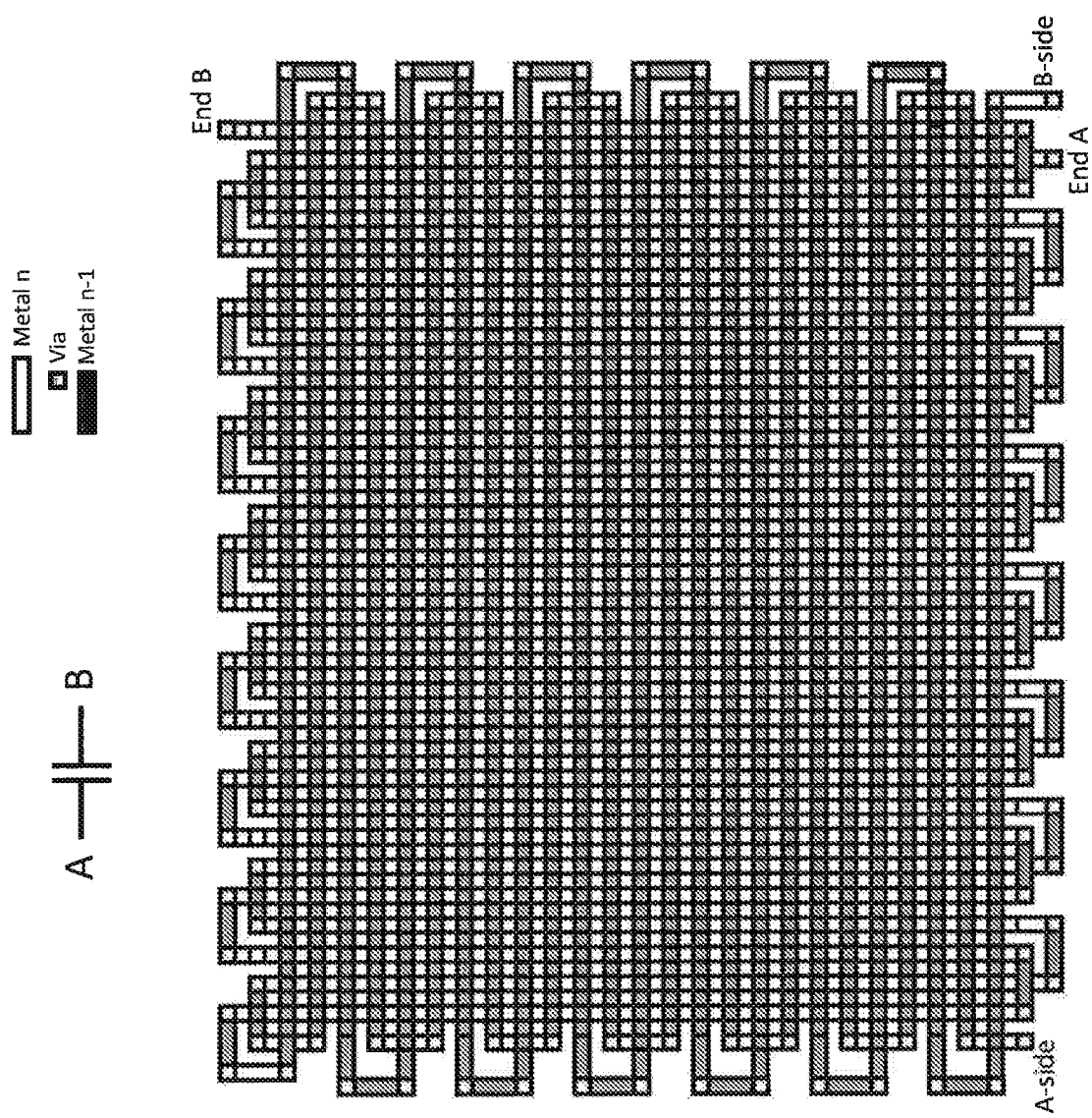
FIG. 2c is a further alternative example of an embodiment fringe capacitor layout for use in embodiments of the invention.

The capacitance value of the fringe capacitance in FIG. 2a, 2b, 2c will change if any part of the finger pattern of each layer is altered structurally, for instance by an invasive attack which alters or breaks the shape of the finger pattern. Touching a part of the capacitor constitutes tampering as the touching element could be a probe. The touching element will when touching the capacitor changes the capacitive value of the capacitor. The present system is also sensitive to tampering caused by probing or touching a part of any one of the capacitors in the system.

Unlike conventional fringe capacitor designs, the finger arrangements in the fringe capacitors in embodiments of the invention are not necessarily selected to achieve a maximum capacitance for a minimum area. By contrast, the finger patterns are selected in such a way to cause a significant change in capacitance if the metal layer N and/or the metal layer N−1 directly beneath the fringe capacitor are touched, cut or otherwise structurally altered, examples in FIGS. 2a, 2b and 2c. The intent of the finger patterns used in the embodiments of the fringe capacitors in the invention are selected to provide a secure area under which the security sensitive parts of the integrated circuit are placed to minimise the possibility of a third party gaining physical access from above through the metal layers occupied or partially occupied by fringe capacitors in the integrated circuit.

The layout top view in FIG. 2a is of one layer of a two layer embodiment of a metal fringe capacitor for use in embodiments of the invention, where the long metal strips are referred to as the fingers of the fringe capacitor. The layout top view in FIG. 2b is of a second layer of the two layer embodiment of the metal fringe capacitor. A unit area fringe capacitor would be constructed by overlaying the two structures of FIG. 2a and FIG. 2b. Either pattern may be used as the top layer of the fringe capacitor i.e. the layers are interchangeable.

FIG. 2c is a further example of a fringe capacitor layout, with the required properties that suit embodiments of this invention. In this construction the fingers are very long, with each plate of the capacitor forming a single finger over both layers.

Figure 3:
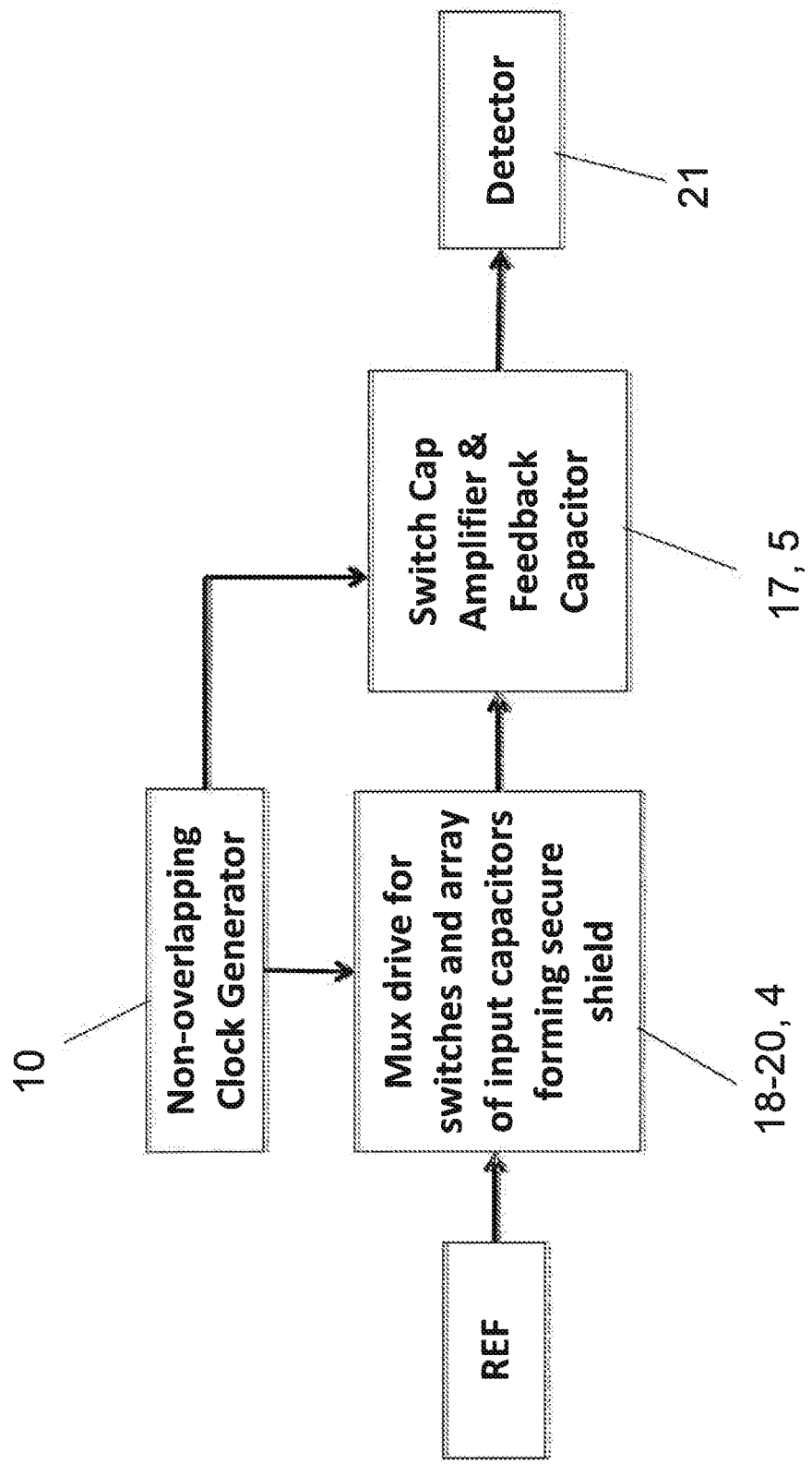
FIG. 3 is a generic schematic diagram of a tamper detection arrangement of an embodiment of the invention.

Many fringe capacitor layout designs are conceivable with the properties that if an adversary wishes to attack the device by getting access to signals beneath the array of fringe capacitors, then if top fringe capacitor metal layer was attacked in manner to minimise the fringe capacitance change, then the spot directly beneath on the second layer of the fringe capacitor if attacked would cause a significant change in capacitance that would be caught by the detection circuit of FIG. 3

A fringe capacitor structure can be created with more than two layers that ensures there is no silicon visible from above—only the metal shield forming the input capacitor array could be visible. The intent here is that for those skilled in the art there are multiple suitable fringe capacitor layout designs that can be conceived with layout qualities that are desirable for this invention.

It is advantageous to minimise finger spacing, to minimise the size of the interstitial areas, but there are practical limits for reducing the spacing between fingers to minimise interstitial spaces and different tolerance levels pertaining to metal density levels, DFM (design for manufacturing) and OPC (optical proximity correction) rules will apply depending on the chip fabrication process geometry being used and materials. Further fringe capacitors are applicable to both damascene and non-damascene backend of line processes and layers. In addition for long fingered capacitors designs as shown in FIG. 2c, antenna metallisation design rules need to be taken into account.

These fringe capacitor layers have the added advantage of also forming a metal screen above the secure area, especially if a 3 layer fringe capacitor was used in the embodiment for the input capacitors. This metal screen also forms a localised EM shield.

FIG. 3 is a generic schematic diagram of a tamper detection arrangement of an embodiment of the invention, comprising a) a reference level for an amplifier input, b) a non-overlapping clock generator circuit to drive the switches across the capacitors around the amplifier, c) an array of switches that connect to the array of input unit capacitors forming the shield to, d) a switch cap amplifier and its feedback capacitor and e) the detector at output of the amplifier to flag an alarm if an intrusion has taken place.

FIG. 4a is an example circuit diagram of a single ended switched capacitor amplifier that forms part of an embodiment of the invention, a differential switched capacitor amplifier would be used in practice to improve the sensitivity. The single ended switched capacitor amplifier circuit is shown in a first mode of operation in FIG. 4a. FIG. 4b is the circuit of FIG. 4a in a second mode of operation and FIG. 4c is the same circuit as FIG. 4a in a third mode of operation.

Figure 5:
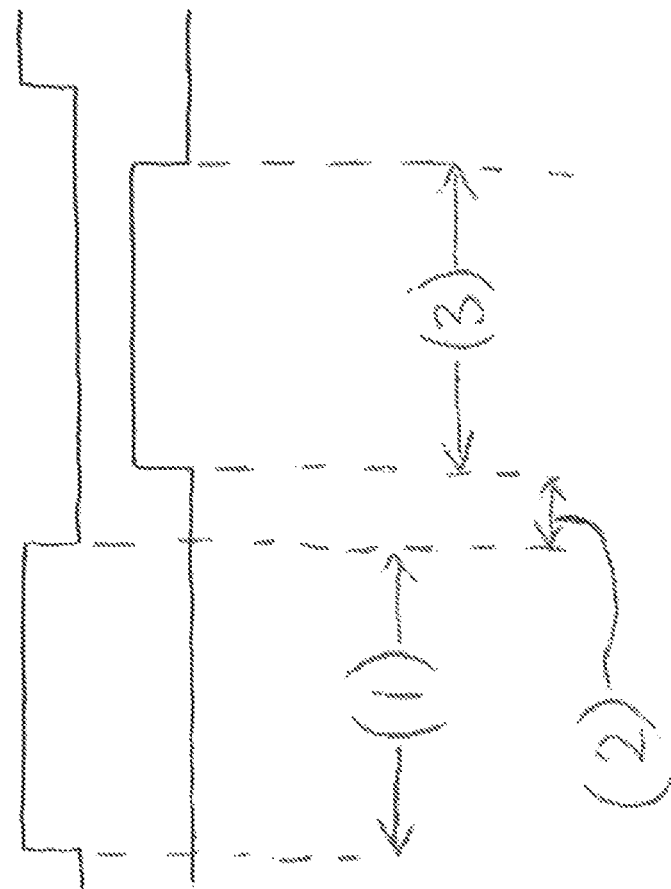
FIG. 5 is a graphical representation of a timing signal of a non-overlapping clock signal used for driving a switched capacitor amplifier of an embodiment of the invention and shows the operational time windows for the respective modes of operation.

FIG. 5 is a graphical representation of a timing signal of a non-overlapping clock signal used for driving a switched capacitor amplifier of an embodiment of the invention and shows the operational time windows for each of the three modes of operation. A non-overlapping clock is necessary in switched capacitor amplifier circuits to preserve charge transfer during the switch periods, and not have undesired leakage charge transfer during the clock transition periods.

Figure 6:
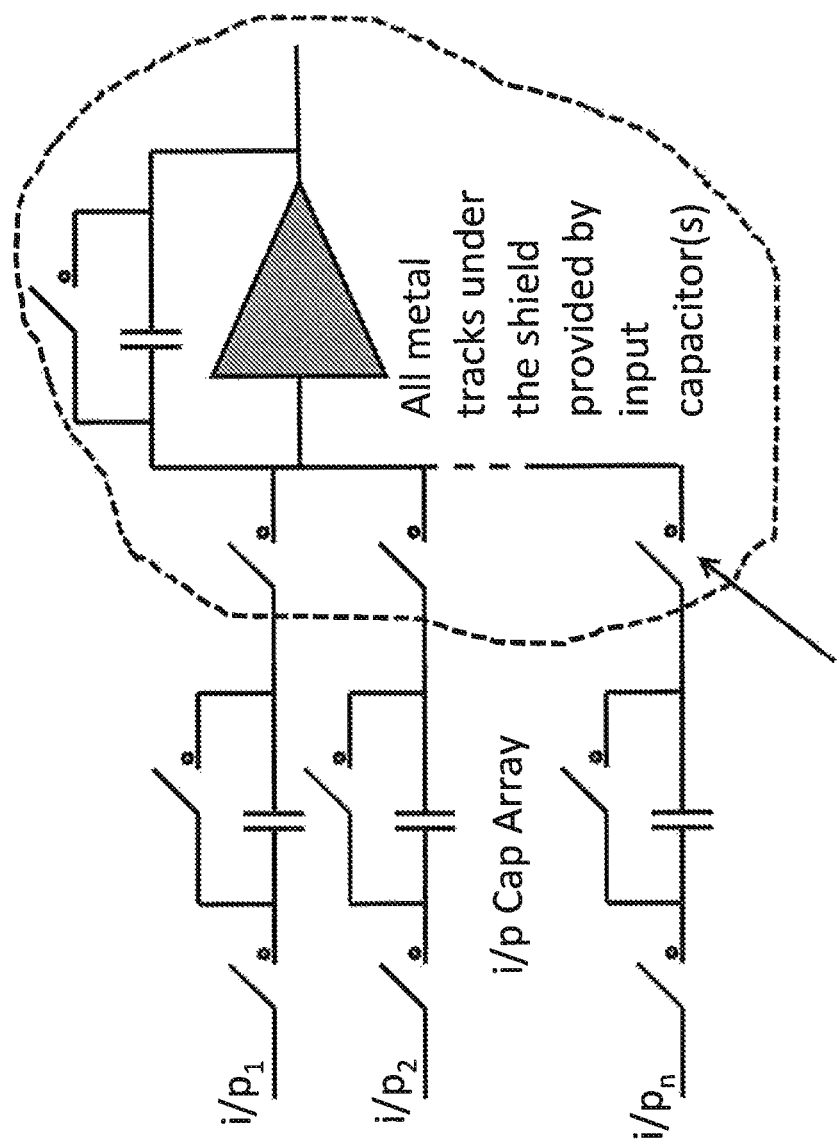
FIG. 6 is a circuit diagram showing an additional switch in series with a switched capacitor amplifier and a feedback capacitor for use in embodiments of the present invention.

As shown in FIG. 6, an additional switch is provided in series with the switched capacitor amplifier and the feedback capacitor so that the feedback capacitor terminal is not directly available for access via a probe on the capacitor array.

The input fringe capacitors 4 are laid out in such a manner to cover the entire designated secure area with no gaps for an intruder to access without disturbing the fringe capacitors. The preferred embodiment of these anti-tamper fringe capacitors is to use two metal layers directly above the metal layers used for the connectivity of the designated secure integrated circuit area 2. In practice other embodiments can be constructed using more than two layers but this is more expensive in terms of use of silicon leaving fewer metal layers available for the connectivity of the secure area 2. Likewise, the technique can also be implemented with a single layer input fringe capacitor as the sole capacitive contribution to the array, but this would allow the gaps between the fingers to be used to attack the sensitive area 2. This is not such a secure solution.

The composite area defined by the overlapping boundaries of the capacitors in the array 4 extends substantially over all of the shielded area 2 to provide a shield layer or layers which would be physically altered or broken during an attempt to gain physical access or probing access to the shielded area of the IC 1.

The capacitors making up the array of capacitors 4 each comprise at least a first capacitor having a predetermined capacitance value in a first layer N and a second capacitor having a predetermined capacitance value in a second layer N−1. Each capacitor in the array of capacitors 4 serves to obscure or shield a part of the sensitive area 2. Further overlaid and/or over-lapping capacitors can be provided in further metal layers, for example N+1, N−2.

The array of capacitors 4 obscures almost all of or totally covers the sensitive area. It is therefore very difficult or near impossible for a third party to gain access (for example by laser ablating, FIB or etching) to the integrated circuit 1 without touching, breaking or structurally altering one of the fingers in the capacitors in the array 4.

The Switched Capacitor Amplifier:

The switched amplifier arrangements employed in embodiments of the invention advantageously measure the ratio of the capacitances of the capacitors rather than the absolute capacitance values. The input array of capacitors 4 are preferably matched by their similar layout pattern.

Note that the gain of the amplifier 17 is set by the ratio of the input capacitor 4 over the feedback capacitor 5, so a small feedback capacitor 5 gives a large gain. This small feedback capacitor 5 is small in terms of capacitance and component size and is most desirable because it will be located in the secure area under the input capacitor array 4 and consumes a minimal amount of silicon real estate area in the designated secure area 2.

In the switch and capacitor amplifier circuit shown in FIGS. 4a-4c the gain of the circuit is set by the ratio of the capacitance values of the input capacitance 4 and the feedback capacitance 5. The feedback capacitor 5 is placed in the designated secure area under the array of input capacitor(s). This precaution prevents an invasive attacker from gaining access to the terminal of the feedback capacitor 5 and adding capacitance by means of simply placing a probe on the correct side of the feedback capacitor to reduce the gain of the circuit to a negligible level so that physical tampering of the input capacitors would not be detected.

FIG. 6 shows a more detailed embodiment incorporating an additional switch in series with the feedback capacitor and switched capacitor amplifier to prevent an adversary from direct access to the feedback capacitor terminal from capacitor shield terminal of the input capacitor array.

In the preferred embodiment the switched capacitor amplifier circuit is a differential switched capacitor amplifier circuit, the circuit detects and amplifies the difference in two input capacitors. High gain is achieved similarly in the differential embodiment by making the feedback capacitors 5 small in comparison to the input capacitors. The differential solution is the most practicable. This differential switched capacitor amplifier circuit allows accurate sensing of physical tampering which touches or structurally alters any part of the input capacitor(s) which are most preferably configured as fringe capacitors.

Sensing Arrangement:

The sensing arrangement 3 will now be further described with reference to FIGS. 3-6 of the accompanying drawings.

The tamper detection arrangement 3 incorporates a sensing arrangement 6 within the integrated circuit 1. The sensing arrangement 3 is connected electrically to the array of capacitors 4 and the feedback capacitor 5. The sensing arrangement 3 is also connected to other functional areas of the IC 1. Preferably, the sensing arrangement 3 is configured as part of the IC 1.

In this embodiment, the sensing arrangement 3 incorporates a clock signal generator 10 integral within the IC 1.

The same spatial location considerations apply to the sensing arrangement 6 circuitry as to the shielded area 2. The area occupied by the sensing arrangement circuitry 6 is small relative to and within the area of the array 4.

In one embodiment of the invention, the sensing arrangement incorporates an amplifier 17 and a plurality of switches 18-20. The amplifier 17 and the switches 18-20 are connected with the capacitors 4, 5 to form a switched capacitor amplifier circuit, such as the circuit shown in FIGS. 4a-4c. The switched capacitor amplifier circuit is shown here as a single ended amplifier circuit, but in a preferred embodiment of the invention the switched capacitor amplifier circuit is a differential switched capacitor amplifier circuit.

In operation, the switch and capacitor amplifier circuit is driven by a non-overlapping clock signal, as shown in FIG. 5. The non-overlapping clock signal switches the switches 18-20 so that the circuit operates in the three modes of operation shown respectively in respective FIGS. 4a-4c. The timing diagram of FIG. 5 shows the phases of operation of each of the three modes, (1), (2) and (3).

If the capacitance value of at least one (any one or just one) of the capacitors in the input capacitor array 4 is changed from its predetermined value by touching by a probe or structural modification of the finger pattern then the gain of the switched capacitor amplifier circuit changes and the output signal from the circuit is altered. A detector 21 detects this alteration in the output signal from the amplifier circuit which is indicative of physical tampering by touching or altering the physical structure of at least one of the input capacitor array 4.

The detector 21 is preferably integral to the IC 1 and is operable to provide an alarm signal to the IC 1 in the event that tampering is detected. The alarm signal preferably triggers the IC 1 to enter a security mode to protect sensitive information stored in the IC 1 or to prevent operation of the IC 1. In one embodiment, the alarm signal triggers the IC 1 to erase the sensitive information in the memory (in the sensitive area 2), or put the integrated circuit into a secure mode. In another embodiment, the alarm signal triggers the IC 1 to permanently render the IC 1 unusable.

These embodiments preferably incorporate a multiplexer to multiplex the plurality of input capacitors 4 together so that the multiple capacitors can be used with a single amplifier. Additional amplifiers could be used but it is more efficient to use a multiplexer to multiplex a plurality of switches and capacitors with a single amplifier feedback capacitor 5, or in a differential embodiment two feedback capacitors 5.

In embodiments of this invention a change in an amplifiers gain that indicates whether or not an invasive attack is taking place or has taken place. In addition this technique requires a small silicon real estate in active secure area in comparison to the size of the silicon area that can be protected by the scheme.

The security of the arrangement can be further increased by incorporating a sequencer to the multiplexer so that controls the switches, This has the advantage that the multiplexed input capacitors are being switched so it is not the same pair of capacitors 4 in the input capacitor array being compared in respective measurement cycles. Thus, an attacker is not aware which capacitor is being compared at any given time. The sequencing of the multiplexer can also be changed or can be pseudo-random. This would further enhance the security against a sophisticated adversary, who was prepared to invest significant time and resources in planning the attack. With the sequencer applied to the multiplexor the adversary would not know at what instant which pairs of capacitors in the array where being paired for comparison measurements.

Embodiments of this tamper proof arrangement provide an effective solution for detecting physical attacks to an integrated circuit. Embodiments of the invention can operate at a low frequency than known systems and therefore consume less power than conventional tamper detection arrangement.

When used in this specification and claims, the terms "comprises" and "comprising" and variations thereof mean that the specified features, steps or integers are included. The terms are not to be interpreted to exclude the presence of other features, steps or components.

What is claimed is:

1. A tamper detection arrangement for use within an integrated circuit comprising:
   a metal stack of interconnect metal layers;
   at least one input capacitor having a first capacitance value; wherein the at least one capacitor is formed in the metal stack;
   a feedback capacitor having a second capacitance value;
   a sensing arrangement comprising an amplifier circuit having the at least one input capacitor as an input and the at least one feedback capacitor in a feedback loop across the amplifier circuit operable to detect a change in a ratio of capacitance values between the first capacitance value of the at least one input capacitor and the second capacitance value of the feedback capacitor; and
   a protective shield to protect a sensitive area of the integrated circuit from tampering, the protective shield being provided by the at least one input capacitor.

2. The arrangement of claim 1, wherein the amplifier circuit comprises a differential amplifier.

3. The arrangement of claim 1, wherein gain of the amplifier circuit is dictated by the ratio of capacitance values between the first capacitance value of the at least one input capacitor and the second capacitance value of the feedback capacitor.

4. The arrangement of claim 1, wherein the sensing arrangement is operable to detect a change in the ratio of the capacitance values when the structure of one of the capacitors is physically tampered with and to provide an output signal to indicate that physical tampering has occurred.

5. The arrangement of claim 1, wherein at least a part of the at least one input capacitor is formed from at least one layer of the metal stack of the integrated circuit.

6. The arrangement of claim 1, wherein the sensing arrangement comprises an amplifier and a plurality of switches, the amplifier and the plurality of switches being connected with the first and second capacitors to form a switched capacitor amplifier circuit.

7. The arrangement of claim 1, wherein the switched capacitor amplifier circuit is a single ended switched capacitor amplifier circuit.

8. The arrangement of claim 1, wherein the switched capacitor amplifier circuit is a differential switched capacitor amplifier circuit.

9. The arrangement of claim 1, wherein the at least one feedback capacitor is positioned within the area overlaid by the protective shield.

10. The arrangement of claim 1, wherein the area defined by the sensitive area is smaller than the area of the protective shield and within a plan boundary of the protective shield.

11. The arrangement of claim 1, wherein a non-overlapping clock generator is a component of the sensing arrangement and is a component of the integrated circuit, the non-overlapping clock generator being positioned under the protective shield.

12. The arrangement of claim 1, wherein one or more further input capacitors are superimposed over the at least one input capacitor to augment the protective shield.

13. The arrangement of claim 3, wherein the feedback capacitor comprises one or more capacitors.

14. The arrangement of claim 1, wherein plural ones of the at least one input capacitor are connected to the sensing arrangement by a multiplexer.

15. The apparatus of claim 14, wherein sequencing of the multiplexer is changeable and/or is pseudo-random.

16. The arrangement of claim 14, wherein the multiplexer switches such that different pairs of capacitors from the at least one input capacitor array are compared in respective measurement cycles.

17. The arrangement of claim 14, wherein the plural ones of the at least one input capacitor are connected by the multiplexer to a single amplifier.

18. The arrangement of claim 1, herein one or more of the at least one input capacitors are fringe capacitors.

19. The arrangement of claim 18, wherein the feedback capacitor is not a fringe capacitor.

20. The arrangement of claim 18, wherein at least some of the fringe capacitors comprise a plurality of interdigitated elongate fingers which are spaced apart from one another.

21. The arrangement of any one of claim 20, wherein the fringe capacitors comprise at least first and second fringe capacitors, wherein finger patterns defined by the interdigitated fingers of the first and second fringe capacitors are the same as one another and are orientated differently from one another.

22. The arrangement of claim 1, wherein one or more components of the sensing arrangement are components of the integrated circuit.

23. The arrangement of claim 22, wherein all components of the sensing arrangement are components of the integrated circuit.

24. The arrangement of claim 23, wherein all components of the tamper detection arrangement are components of the integrated circuit.

25. An integrated circuit incorporating the tamper detection arrangement of claim 1.

26. An integrated circuit package incorporating the integrated circuit of claim 25.

27. A method of detecting physical tampering with an integrated circuit, the method comprising:
   providing a metal stack of interconnect metal layers;
   providing at least one input capacitor having a first capacitance value; wherein the at least one capacitor is formed in the metal stack; .
   providing a feedback capacitor having a second capacitance value;
   providing a sensing arrangement operable to detect tampering using an amplifier circuit having the at least one input capacitor as an input and the at least one feedback capacitor in a. feedback loop across the amplifier operable to detect a change in a ratio of capacitance values between the first capacitance value of the at least one input capacitor and the second capacitance value of the feedback capacitor;
   forming a protective shield to protect a sensitive area of the integrated circuit from at least a part of the at least one input capacitor.

28. The method of claim 27, further comprising providing an output signal that indicates that physical tampering with of the integrated circuit has occurred.

* * * * *

UNITED STATES PATENT AND TRADEMARK OFFICE
CERTIFICATE OF CORRECTION

PATENT NO. : 9,514,308 B2
APPLICATION NO. : 14/204739
DATED : December 6, 2016
INVENTOR(S) : Filippi et al.

It is certified that error appears in the above-identified patent and that said Letters Patent is hereby corrected as shown below:

In the Claims

Column 10, Line 13, Claim 18: replace "herein" with --wherein--;

Column 10, Line 44, Claim 27: delete "." at the end of the paragraph;

Column 10, Line 50, Claim 27: delete "." after "a".

Signed and Sealed this
Twenty-seventh Day of February, 2018

Andrei Iancu
*Director of the United States Patent and Trademark Office*